United States Patent
Rota et al.

(10) Patent No.: US 10,930,114 B2
(45) Date of Patent: *Feb. 23, 2021

(54) SYSTEM FOR REAL TIME ATTENDANCE FROM A REMOTE GAME SITE TO A GAME GOING ON AT RELOCATED GAME SITE

(71) Applicant: Novomatic AG, Gumpoldskirchen (AT)

(72) Inventors: Franco Sergio Rota, Zurich (CH); Emilio Pandolfo, Rome (IT); Marcin Wojciech Lypka, Faellanden (CH)

(73) Assignee: Novomatic AG, Gumpoldskirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,507

(22) Filed: Oct. 7, 2019

(65) Prior Publication Data
US 2020/0035066 A1   Jan. 30, 2020

Related U.S. Application Data

(63) Continuation of application No. 15/795,830, filed on Oct. 27, 2017, now Pat. No. 10,490,025, and a continuation of application No. PCT/IB2016/052404, filed on Apr. 28, 2016.

(51) Int. Cl.
*G06F 17/00* (2019.01)
*G07F 17/32* (2006.01)
*G06F 16/955* (2019.01)

(52) U.S. Cl.
CPC ...... *G07F 17/3244* (2013.01); *G06F 16/9554* (2019.01); *G07F 17/322* (2013.01); *G07F 17/323* (2013.01); *G07F 17/3213* (2013.01); *G07F 17/3218* (2013.01); *G07F 17/3223* (2013.01); *G07F 17/3288* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 5,762,552 | A * | 6/1998 | Vuong | G07F 17/32 463/17 |
| 10,490,025 | B2 * | 11/2019 | Rota | G07F 17/3223 |
| 2003/0232651 | A1 * | 12/2003 | Huard | G07F 17/3244 463/42 |
| 2007/0157856 | A1 * | 7/2007 | Skoog | A47B 81/061 108/70 |
| 2009/0221375 | A1 * | 9/2009 | Luciano, Jr. | G07F 17/32 463/46 |

(Continued)

FOREIGN PATENT DOCUMENTS

| | | |
|---|---|---|
| CN | 100394431 A | 6/2008 |
| EP | 2469489 A1 | 6/2012 |
| WO | 2009049176 A1 | 4/2009 |

OTHER PUBLICATIONS

International Search Report dated Aug. 19, 2016 on related Application No. PCT/IB2016/052404, filed Apr. 28, 2016.

(Continued)

*Primary Examiner* — Paul A D'Agostino
(74) *Attorney, Agent, or Firm* — EIP US LLP (57) ABSTRACT

Systems and methods for real time attendance, from a remote game site, at a game going on at relocated game site.

19 Claims, 4 Drawing Sheets

(56) References Cited

U.S. PATENT DOCUMENTS

| | | | | |
|---|---|---|---|---|
| 2009/0264197 A1* | 10/2009 | Fujimoto | ............... | A63F 9/24 |
| | | | | 463/31 |
| 2010/0113148 A1* | 5/2010 | Haltovsky | ............... | A63F 13/26 |
| | | | | 463/30 |
| 2011/0098095 A1* | 4/2011 | Kuhn | ............... | G06F 3/0488 |
| | | | | 463/16 |
| 2013/0244784 A1* | 9/2013 | Assa | ............... | A63F 13/80 |
| | | | | 463/40 |
| 2014/0357361 A1* | 12/2014 | Rajaraman | ............ | G07F 17/323 |
| | | | | 463/31 |
| 2015/0170473 A1 | 6/2015 | Hematji et al. | | |

OTHER PUBLICATIONS

United States Office Action Non-Final Office action dated Apr. 5, 2019 on U.S. Appl. No. 15/795,830.

* cited by examiner

SYSTEM FOR REAL TIME ATTENDANCE FROM A REMOTE GAME SITE TO A GAME GOING ON AT RELOCATED GAME SITE

CROSS-REFERENCE TO RELATED APPLICATIONS

This application is a continuation under 35 U.S.C. § 120 of U.S. application Ser. No. 15/795,830 filed Oct. 27, 2017, which is a continuation of International Application No. PCT/IB2016/052404, filed Apr. 28, 2016, which claims priority to Italian Application No. RM2015A000181, filed Apr. 28, 2015, under 35 U.S.C. § 119(a). Each of the above-referenced patent applications is hereby incorporated by reference in its entirety.

BACKGROUND OF THE INVENTION

Field of the Invention

The present invention relates to a system for real time attendance, from a remote game site, at a game going on at relocated game site.

Description of the Related Technology

In particular, the aim set by the present disclosure is to allow the attendance at a game, in real time and remotely, with respect to a relocated site wherein the game is going on in reality, by favoring the game experience and by simplifying it from a technical point of view.

This is obtained through a system as disclosed herein.

Additional features of the disclosed embodiments are described below.

The advantages, together with the features and use modes of the disclosed embodiments, are evident from the following detailed description, shown by way of example and not for limitative purpose.

BRIEF DESCRIPTION OF THE DRAWINGS

The figures of the enclosed drawings will be referred to, wherein.

The present disclosure will be described hereinafter by making reference to the above-mentioned figures.

DETAILED DESCRIPTION OF CERTAIN INVENTIVE EMBODIMENTS

The present disclosure aims at promoting the real time game, by complying with the provisions of the legislation and of the regulations in public game matters, inside rooms placed in game sites, which are remote with respect to a relocated site where the game is actually going on. In particular, according to one embodiment, the games which will be promoted in the starting phase of the plan are roulette and baccarat.

However it is provided that Punto Banco game and on-line black jack game will be added to the on-line baccarat game.

Example elements one aims at for re-creating a game context which is comfortable as much as possible and suitable for promoting the on-line game include:

1. a real time attendance at the game sessions of the relocated site;

2. a furnishing of the remote site adequate to the promoted on-line game services, apt to re-create the environment of the relocated site;

3. a game use mode favoring the involvement of the gamers and the socialization thereof.

Below, aspects for the description of the plan are analyzed. In particular, the game cycle is described.

Figure 1:
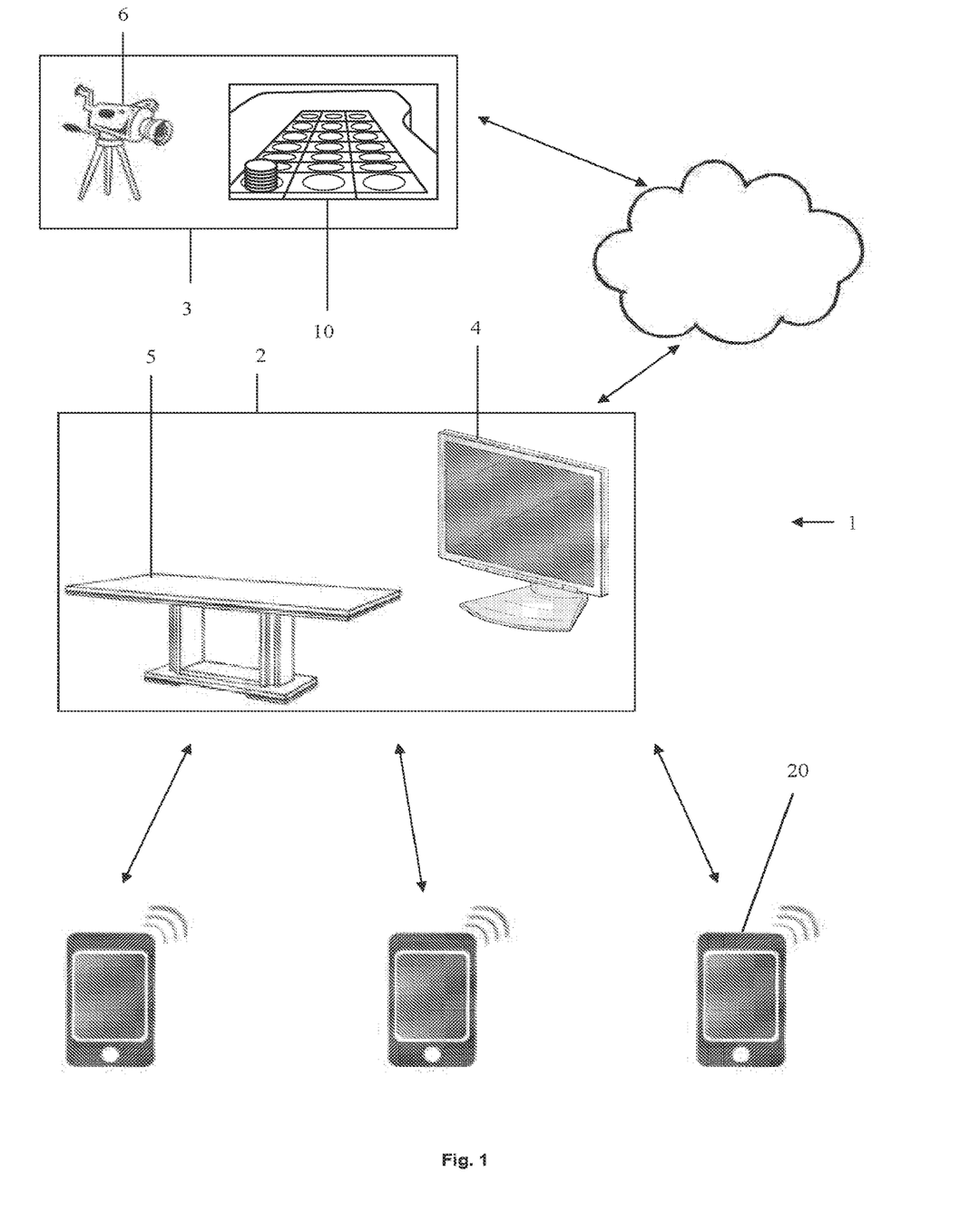
FIG. 1 shows an exemplifying scheme of a system according to one embodiment.

By making firstly reference to FIG. 1, a schematization of a system according to the present invention is shown.

In general terms, a system 1 for the real time attendance, from a remote game site 2, at a game going on at relocated game site 3, comprises means 4, 6 for the audio and video reproduction of recordings of the relocated game site 3, at said remote game site 2, and means 5 for virtually repeating, in said remote game site 2, a game surface 10 existing in said relocated game site 3.

Furthermore, the system comprises one or more interface devices 20 apt to allow an interaction between a gamer and said game surface 10 existing in said relocated game site 3.

In order to make clear the modes therewith one wants to promote the real time remote game, the complete cycle which is performed by the gamer in this context is described hereinafter.

The cycle starts when a gamer enters the room of the remote site 2 (shown in FIG. 2A) and, after acquiring the information reported inside the room and after viewing the live game session, coming from the relocated site 3, projected on one or more monitors/tv sets 4 of the room itself, wishes to attend the game.

Figure 2A:
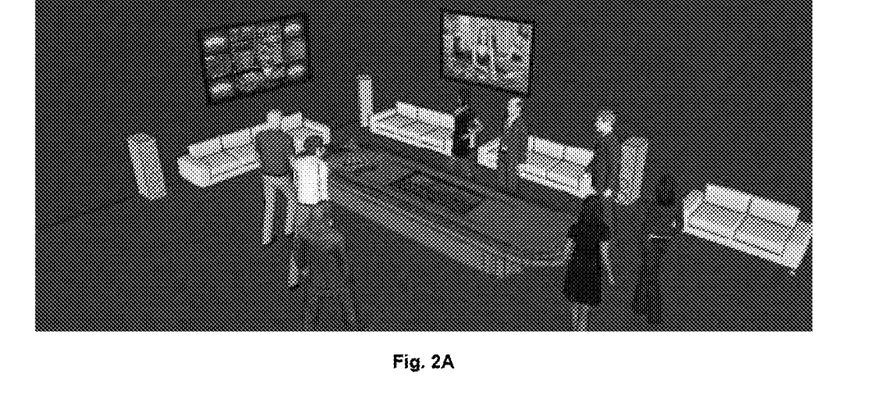
FIG. 2A an exemplifying view of a remote site room according to one embodiment.

To this purpose the system provides the use of one or more interface devices 20 which, by way of example, may comprise at least a programmable electronic device of wireless type, for example a smartphone, or a tablet, or the like.

Each programmable electronic device comprises a display, and it is configured for reproducing on said display information related to the game surface 10 existing in the relocated game site 3.

Furthermore, advantageously, the programmable electronic device is programmed so as to allow the gamer to attend the game from said remote site 2.

For example, by exploiting current smartphones (or tablets or the like), the gamer is allowed, following registration on a web platform, to download an Application for accessing the game on his/her own smartphone or tablet (hereinafter such Application will be referred to with the short term App).

At this point, the gamer may load the funds he/she wishes on his/her own game account and he/she is ready to attend the available games.

As previously mentioned, the means 4 for the audio and video reproduction comprises one or more cameras 6 arranged at the relocated game site 3 and/or one or more monitors/tv sets arranged at the remote game site 2.

In this way, in order to improve the game experience of the gamer, the live broadcast of the game session really performed by a croupier operating at the relocated side 3, is made available on a big monitor/tv set, which the gamer may attend through his/her own game App available on his/her own mobile device (smartphone or tablet or the like). For example, in case of the roulette game, the gamer has available on his/her own mobile device an App reproducing chips and game table, therethrough he/she may perform bets by touching the table area of interest.

Figure 2B:
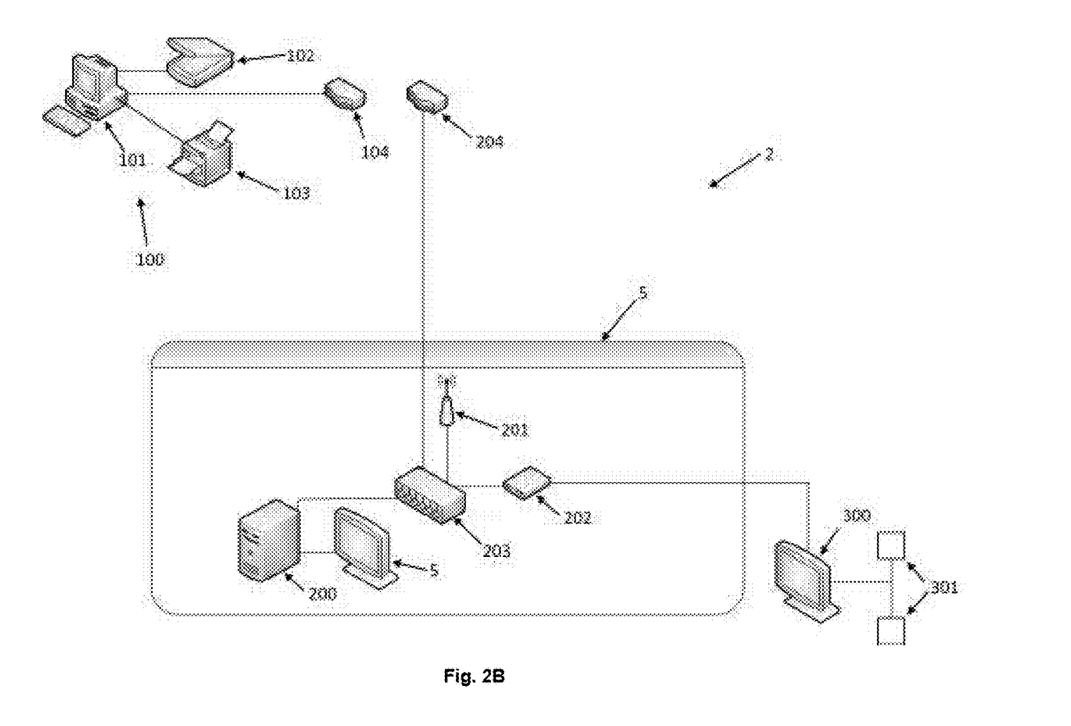
FIG. 2B is a schematization of a remote game site according to one embodiment.

FIG. 2B shows, schematically, the main components of a remote game site 2 according to one embodiment.

In particular, a cash station 100 is shown, which will be handled by an operator of the game site 2, usable for example by the gamers for the preliminary procedures of loading funds onto their own game account.

The cash station 100 provides a personal computer 101, thereto a scanner 102 and a printer 103 are advantageously connected for the administrative type requirements (registration of gamers, scanning of identity documents, etc.). The cash station 100 could further be equipped with a router 104 (preferably of wireless type) for accessing a local network.

Furthermore, in order to improve the game experience of the gamer and to promote the socialization with other people present in the room, inside the same there are means for virtually repeating the game surface 10. Said means comprises a game table 5, also shown in FIG. 2B.

Figure 4:
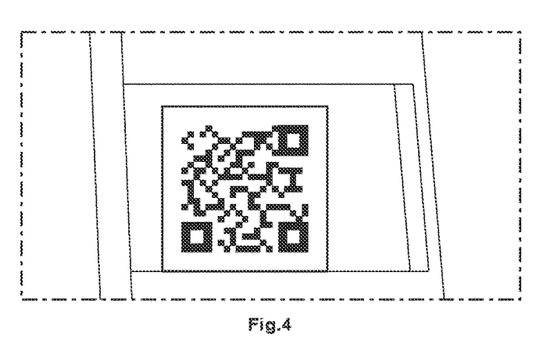
FIG. 4 shows a room code of the QR-Code type, identifying the game table, according to one embodiment.

The game table 5 is equipped with apparatuses for implementing the function thereof of repeating the game surface 10. In particular, the game table 5 comprises a horizontal, preferably high-definition monitor, whereon an image is reproduced, shown by way of example in FIG. 5, updated in real time, of the game surface 10, existing in the relocated game site 3, and a QR-Code of the room identifying the table, shown by way of example in FIG. 4.

Figure 5:
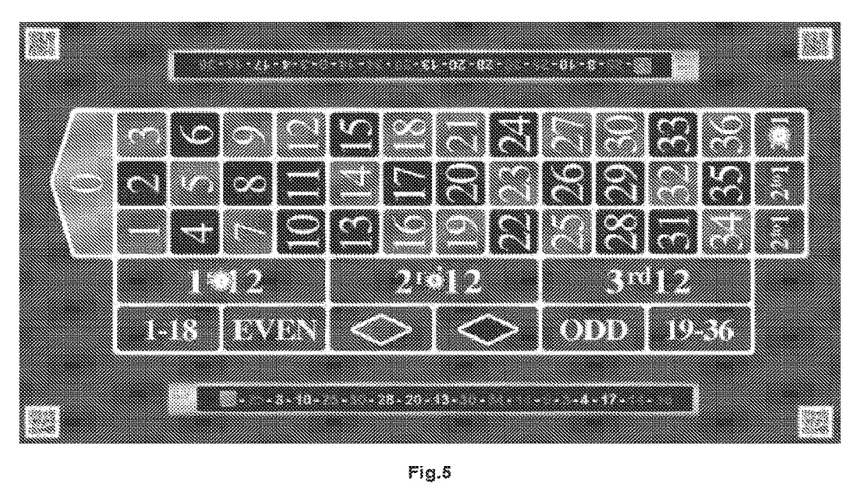
FIG. 5 shows the interface of a game table of the remote game site, in case the user is playing at a roulette game, according to one embodiment.

Thanks to the help of such means, each bet performed by the gamer through his/her own App is repeated even onto the horizontal monitor, which reproduces the game layout of the roulette itself (FIG. 5). Said horizontal monitor has no interactive feature, but it reproduces exclusively what made individually by each gamer on his/her own mobile device.

Furthermore, as it is still visible in FIG. 2B, the game table 5 in turn comprises apparatuses to be connected, preferably in wireless mode, to the local network and, by means of internet, to the relocated game site. To this purpose, a processor 200 may be provided, thereto an access point 201, for the connection to Internet, and a router 204, for the connection to the local network, are connected, for example by means of a switch 203.

Furthermore, an additional monitor 300, arranged in the room of the remote game site 2, may be connected to the processor 200, in case by means of an additional personal computer 202, for enjoying a live broadcast by the gamers and/or other present people. Other multimedia devices, such as for example loudspeaker baffles 301, may be connected to the monitor.

Advantageously, by means of the cash PC 101, positioned in the cash station, the operator is capable to handle the devices constituting the system. For example, he/she could turn off and/or re-start the table, turn-off or re-start the PC for the live broadcast, change the camera for displaying the live broadcast from the casino.

Figure 6:
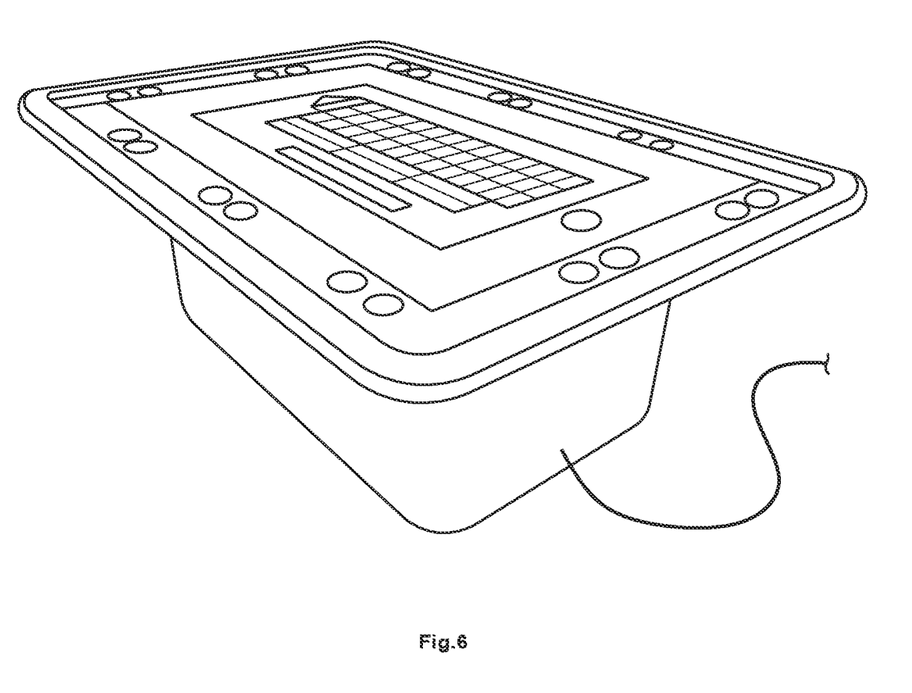
FIG. 6 shows a game table of the remote game site, according to one embodiment.

The game table 5 inside the room has a shape very similar to that of a real casino-like table (FIG. 6).

Said table is capable of improving the game experience of the gamer by favoring the socialization thereof with other people present in the room, by allowing the following procedures:

receiving the gamers and the devices and drinks thereof;

reproducing the QR-Code of the room identifying the table;

reproducing the layout for the performed casino-like game bets;

reproducing the winning number (or the hand) and of the game statistics;

reproducing the bets performed by the gamers present in the room.

Furthermore, it is equipped with stools to make the gamers to sit down around the periphery thereof, by offering the latter the possibility of positioning their own drinks in suitable housing and resting easily their own smartphones or tablets during the succession of the several game sessions.

At the end of the game, the gamer who wishes to withdraw the funds existing on his/her own game account may do it by using the technological infrastructures supporting the electronic money instruments existing in the room itself Phase for Registering on the Web Platform The mechanism provided for registering the gamer onto the web platform, according to one embodiment, is the following.

The not registered gamer goes to a registration point (or cash station), wherein it provides to an operator his/her own identity card, fiscal code, mobile phone number and e-mail address.

The operator positions the documents under an OCR and the recording software acquires the included data and uses them to compile, automatically, a customer registration form, apart from the possibility of inserting possible missing data, such as for example e-mail address, by an operator in manual mode.

Furthermore, the software, still automatically, generates a username (obtained by means a code for processing the customer data) and a password, not visible by the operator himself/herself.

In this phase, the operator's software interacts with that of the Web platform to verify the correctness and uniqueness of the entered data. In particular, username and password are checked, which, if validated, are proposed to the customer printed on a receipt.

Once the data have been validated, the customer enters username and password—by copying them from the print received from the operator—onto the App to perform the first access. With such identifying credentials, the App downloads and proposes to the customer the corresponding game contract which may be accepted as in case of a software license.

After the contract acceptance, which is communicated to the system by electronic means, the gamer is registered on the game platform.

Step of Downloading and Starting the App for Accessing the Game

As said previously, in order to access the on-line game platform, the gamer downloads an App on his/her own device, by following the instructions provided to him by the operator at a registration point, which will have also indicated how activating and configuring the room's Wi-Fi connection on his/her own device.

The game App is the App which the gamer has available on his/her own smartphone or tablet or the like (both of Android and iOS type) to attend the on-line game session inside the room. Substantially, the game App allows the following procedures:

associating the user to the room game table by scanning a QR-Code;

selecting the color of the chips therewith the bets performed by the user will be reproduced onto the game table;

accessing the game;

detecting and sending the bets performed by the user to the game table.

Once downloaded and started the App for accessing the game, this shows a screen allowing the user to decide if he/she wants to play in a room arranged to house the game system, together with other users, or to play on his/her own (for example staying at home). In the first case ("Accessing the game with QR Code"), the user accesses the screen for scanning the room QR-Code, whereas, in the second case ("Accessing directly the game"), the user is redirected directly to the login screen.

In order to play in the room, a picture of the QR-Code reproduced onto the horizontal screen 5 of the table existing in the room itself is acquired.

When the user selects the item "Accessing the game with QR-Code", the App searches for and connects automatically to the dedicated Wi-Fi network, thus allowing to detect the user in the specific game room and, still, to associate the user to the specific game table.

However, the use of proximity mechanisms alternative to the QR-Code, such as the detection of the room's Wi-Fi network, Bluetooth, or ultrasounds may be provided.

After having acquired the QR-Code, at first a screen is open for selecting the color therewith the chips will be reproduced onto the game table and then directly the screen is open for inserting the credentials. Once inserted such credentials, the customer may even tick off the option for storing the same, so that for future accesses it is no more necessary to re-enter them.

The first time it performs the login, the game App shows to the customer the game contract which may be accepted simply by pressing on a suitable button.

On the contrary, the subsequent times the user could perform the access by simply pressing the login button without having the contract to be re-proposed or having to enter again his/her own credentials, if the previous time he/she has ticked off the option for storing the same.

After acquiring the QR-Code and inserting the credentials (username and password), the game App goes in background, it launches automatically the browser to the address including the game application and it maps all bets performed by the customer on the game interface. From this moment on, in fact, all actions performed by the user on such interface (bets included) are intercepted by the app in background and sent instantaneously to the game table by allowing the reproduction thereof on it.

Thanks to the rapidity therewith information is intercepted and transmitted by the App to the table (less than 0.2 sec), and the similarity between interface on the table and on the App allowing to perform the game, the gamer has the feeling to "put down" the game chip onto the table by using his/her own smartphone or tablet or the like.

Step of Loading the Game Account

Figure 3:
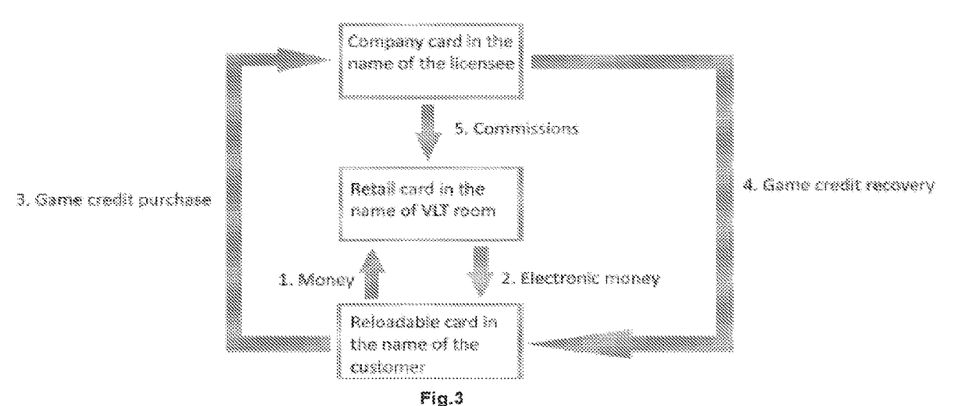
FIG. 3 is a schematic representation of the flow of the gamers' money used in the game activity, according to one embodiment.

The loading of the game account takes place according to the following mechanism, according to one embodiment, shown schematically in FIG. 3.

The customer refills cash funds on his/her own card at the room operator and moves the wished funds from his/her own card onto the licensee's one by using the dedicated App, allowing him/her to define the amount to be moved.

The licensee receives a notification of occurred crediting of the customer funds, therethrough it is possible automatically to proceed with reloading the game account of the latter.

In the game App a user menu is integrated allowing to access quickly the information of the game account, to withdraw other funds from the account and to bring them onto the game, to access information of the responsible game and to perform the logout.

Step of Detecting the Customer Near the Room/Table

The detection of the gamers in the room takes place in the following way.

The gamer, by means of the App for accessing the game, takes a picture of the QR-Code reproduced automatically onto the horizontal monitor existing onto the room table. The App sends to the table the username of the gamer, which thus results to be detected in that specific room.

As already said, the use of proximity mechanisms alternative to the QR-Code may however be provided, such as the detection of the room Wi-Fi network, Bluetooth, or ultrasound.

Gaming Step (Example of the Roulette Game)

The gamer attends the game session, by following live what happens in the relocated site 3, transmitted for example by means of two monitors/tv sets present in the room 2, one positioned vertically 4 and the other one positioned horizontally onto the table 5. In particular:

onto the vertical monitor/tv set 4 the croupier's instructions are transmitted, who may perform a variety of actions, such as for example declaring the open or closed game, showing the launch of small ball in the roulette and communicating the final result in the game session;

onto the horizontal monitor/tv set 5 the layout for the bets is reproduced, wherein all bets performed by the gamers during the game session are represented.

The communication system transmits to the vertical monitor in the room the live game sessions from the relocated site 3 for example by means of a satellite streaming or Internet connection.

Onto the vertical monitor even:

the roulette cylinder, in rotation, to show the gamer the image of the small ball which stops on the winning number;

the chronology of the last extracted numbers and the game statistics are displayed.

The live broadcasting of the game sessions is made available in order to improve the game experience of the gamer by allowing:

the display of the live broadcasting of the game sessions from the relocated site 3;

the diffusion of casino sounds associated to the live broadcast (sound of the small ball in the roulette cylinder, sound of the playing cards, croupier voice).

On the contrary, onto the horizontal monitor space is left to the display of chips and the layout for the bets.

By means of the control panel made available for the operator in the cash station, in the room one could decide if adding to the live display a "blinking" animation for the last released numbers existing in the panel of statistics. Furthermore, the room operator could decide if he/she wants to display the statistics next to the live video, to display the live broadcast from the casino only or to display the statistics only.

It should be recalled that the game play takes place exclusively through the dedicated App on smartphone or tablet or the like. The table present in the room may be used only to implement a visual effect. In particular, the gamer starts the game App installed on his/her own smartphone or tablet or the like, he/she takes a picture of the QR-Code and selects the color of the chips therewith his/her own bets will be reproduced onto the game table 5. The user may choose a determined color among the available ones, or decide if making him/her to be assigned one in a casual way. In the first case, the user is sent directly to the game application, whereas in the second case (by selecting the function "Skip this passage"), the user is assigned a casual chip color, which he/she may decide to be confirmed or modified.

At this point, the App re-addresses the user automatically to the website managed by the licensee wherein, by entering his/her own credentials, he/she accesses the game application. The latter allows to perform all possible practiced on-line casino game bets and to display exclusively his/her own bets.

In practice, the gamer displays on the App game interface the game layout and all chips available for the bets and first of all, to perform a bet, he/she has to select the chip and then the selected bet option. The game interface on smartphone or tablet or the like reproduces exactly the layout of the running game and it is almost identical in shape and color to that on the monitor embedded in the table 5.

The reproduction of the bets performed on line by the gamers on the room table is possible thanks to a Web Service, dialoguing with a central system, in turn connected to the table software, to define:

the table status;
the winning number;
all game information relating usual gamers present in the room.

The game App provides to the game, via Wi-Fi, information on username of the gamers detected near the latter and those relating the bets performed by them. The game table communicates to the central system the username of the detected gamers, so as to receive, apart from the information related to the table status and the winning number, even that on the bets accepted only by the gamers really present in the room.

The table status shows when the game is open or closed, that is when the gamers' bets have to be, or do not have to be, reproduced onto the monitor/tv set. This avoids that the bet performed by a gamer, when the game is closed, is however displayed onto the table, notwithstanding it has not been accepted by the game platform.

In the game table user messages were added to alert the customer of the imminent closing of the bets or the closing of the same.

At the end of the game session, the central system communicates to the table the winning number and the box of the winning number or hand starts flashing on the game table, together with all chips of the winning bets, whereas statistics are updated. At this point, all losing bets disappear from the table, wherein only the winning ones remain. When the central system communicates the start of a new game session to the table, the flashing of the extracted number stops and the winning bets disappear from the table.

Substantially, according to one embodiment, the mechanism for reproducing the bets is the following one.

As soon as the gamer performs a bet onto the platform of the game App, the latter, by means of a communication system (for example of Wi-Fi type), transmits it to the game table, whereon it is reproduced exactly, so that all gamers present in the room and those attending the same game session may view it.

If a gamer is no longer connected to the Wi-Fi of the VLT room, he/she could no longer interact with the game table and the bets he/she performs will no longer be reproduced thereon.

The bets of the several gamers are reproduced onto the game table with chips with different colors, depending upon the color selected by each one of them on the App. In this way, the chips of each gamer on the game table corresponds a unique color and each one is able to distinguish their bets from those performed by the other ones. The game table reproduces immediately the bet performed in a temporary flashing state. When the table has received the message of occurred bet acceptance, sent by the central system, the reproduced chips will cease to flash, to show that the bet has been accepted and it results to be valid. On the contrary, if within a certain period of time the table does not receive the message of occurred bet acceptance, the reproduced chips disappear, to show that the bet has not been accepted.

Mode for Withdrawing Funds from the Game Account

In order to give the gamer the possibility of withdrawing the funds present on his/her own game account, the following procedure, according to one embodiment, is provided.

The customer who wants to withdraw the funds from his/her own game account forwards the request thereof to the licensee by means of the dedicated App, which allows him/her to define the amount to be withdrawn from the card of the licensee dedicated to the withdrawal, in order to deposit it onto his/her own reloadable card.

The licensee receives a notification of the customer request and, once verified the presence of sufficient funds onto the game account of the latter, at first moves the requested funds from the game account to his/her own card, then from his/her own card to that of the customer.

In that moment the customer may go to the room operator and may withdraw cash funds from his/her own card.

Aspects of One Exemplary Embodiment:

1. It is a system 1 for the real time attendance from a remote game site 2 at a game going on at relocated game site 3, comprising:

means for the audio and video reproduction 4, 6 of recordings of the relocated game site 3 at said remote game site 2;

means 5 for virtually repeating in said remote game site 2 a game surface 10 existing in said relocated game site 3; and one or more interface devices 20 apt to allow an interaction between the gamer and said game surface existing in said relocated game site.

2. The system according to the aspect 1, wherein said means for the audio and video reproduction comprises one or more cameras 6 arranged at said relocated game site 3 and/or one or more monitor 4 arranged at said remote game site 2.

3. The system according to the aspect 1 or 2, wherein said repeating means comprises a game table 5 the surface thereof comprises a monitor whereon the real-time updated image of the game surface existing in said relocated game site is reproduced.

4. The system according to one of the previous aspects, wherein said one or more interface devices 20 comprise at least a programmable electronic device of wireless type.

5. The system according to the aspect 4, wherein said programmable electronic device è a smartphone, or a tablet, or the like.

6. The system according to the aspect 4 or 5, wherein said programmable electronic device comprises a display and it is programmed for reproducing on the display information related to the game surface existing in said relocated game site.

7. The system according to one of the aspects 4 to 6, wherein said programmable electronic device is programmed so as to allow the gamer to attend the game from said remote site.

8. The system according to one of the previous aspects, wherein said game is the roulette game, the baccarat game, "Punto Banco" or the black jack game or variations thereof.

The present disclosure has been so far described with reference to exemplary embodiments thereof. It is to be meant that each one of the technical solutions implemented in the disclosed embodiments, herein described by way of example, may advantageously be combined, in different way with respect to what described, with the other ones, to create additional embodiments, belonging to the same inventive core and however all within the protective scope of the herebelow reported claims.

What is claimed is:

1. A method for real time attendance of one or more users from a remote game site at a game going on at a relocated game site where a game surface exists, the method comprising:
    arranging one or more cameras at the relocated game site for producing audio/video recordings of the relocated game site;
    providing an audio and video reproduction of the recordings of the relocated game site at the remote game site via one or more monitors;
    at a game table located at the game site, virtually reproducing the game surface from the relocated game site, the game table including a monitor whereon the real-time updated image of the game surface existing in said relocated game site is reproduced;
    detecting one or more interface devices via a proximity mechanism and allowing the one or more interface devices to interact with the game table;
    wherein one or more of said one or more interface devices comprises at least a programmable electronic device of a wireless type; and
    wherein each of said programmable electronic devices is programmed so as to allow the respective user to attend the game at said relocated game site while bets performed by the respective user will be reproduced onto the game table at said remote game site.

2. The method of claim 1, which includes
    detecting the one or more interface devices based upon a QR-code;
    adapting the monitor of the game table located at the remote game for reproducing the QR-Code of the room identifying the game table; and
    adapting each of the programmable electronic devices for associating the respective user to the relocated game site upon scanning and processing the QR-Code.

3. The method of claim 1, which includes detecting the one or more interface devices based upon a use of a Wi-Fi network.

4. The method of claim 1, wherein the one or more monitors comprises two monitors, and which includes providing different video reproductions of the recordings of the relocated game site at the remote game site for each of the one or more monitors.

5. The method of claim 1, which includes arranging the monitor of the game table located at the remote game site horizontally.

6. The method of claim 1, wherein the programmable electronic device is a smartphone or tablet.

7. The method of claim 1, which includes reproducing on a display of said one or more programmable electronic devices display information related to the game surface existing in said relocated game site.

8. The method of claim 1, which includes configuring the one or more interface devices to accept access information of the user.

9. The method of claim 1, wherein the game is roulette.

10. The method of claim 9, which includes:
    selecting a color of chips via a selector of said one or more interface devices; and
    displaying bets of each respective user as chips having unique color to distinguish the bet of each respective user.

11. A method comprising:
    arranging one or more cameras at a relocated game site for producing recordings of the relocated game site including a game surface and a game taking place;
    reproducing audio and video of said recordings of the relocated game site at a remote game site;
    virtually repeating in said remote game site, via a game table, the game surface existing in said relocated game site, wherein the game surface comprises a monitor whereon a real time updated image of the game surface existing in said relocated game site is reproduced; and
    adapting a proximity mechanism to detect one or more interface devices at said remote game site and to associate the one or more interface devices to the game surface thereby allowing a respective user of the interface device to attend the game at said relocated game site while bets performed by the respective user on the interface device will be reproduced onto the game table at said remote game site.

12. The method of claim 11, wherein said detect the one or more interface devices at the remote game site and to associate of the one or more interface devices to the game table is based upon a QR-code which is shown at the remote game site and read by said one or more interface devices.

13. The method of claim 11, wherein said reproducing of audio and video comprises reproducing the audio and video via one or more monitors arranged at the remote game site.

14. The method of claim 11, wherein the one or more interface devices is a smartphone or tablet.

15. The method of claim 14, which includes reproducing on a display of the smartphone or tablet, information related to the game surface existing in said relocated game site.

16. The method of claim 11, wherein the one or more interface devices comprises means for inserting access information, and which includes adapting the one or more interface devices for launching automatically a browser with the address of a game application of the relocated game site and for recording each bet made by the user onto a game interface.

17. The method of claim 11, wherein the game is baccarat.

18. The method of claim 11, which includes:
    providing a selector with the one or more interface devices for selecting the color of chips; and
    displaying bets of each respective user as chips having unique color to distinguish each user bet from each of the other user bets.

19. The method of claim 8, which includes, upon scanning and processing a QR-Code via the programmable electronic devices, re-addressing the programmable electronic devices to a website for entering the respective user's own credentials for accessing the game of the relocated game site.

* * * * *